United States Patent
Shipp

(10) Patent No.: US 10,280,263 B1
(45) Date of Patent: May 7, 2019

(54) ELASTOMERIC AND DEGRADABLE POLYANHYDRIDE BY STEP-GROWTH THIOL-ENE PHOTOPOLYMERIZATION

(75) Inventor: Devon A. Shipp, Potsdam, NY (US)

(73) Assignee: CLARKSON UNIVERSITY, Potsdam ( * ) Notice: Subject to any disclaimer, the term of this patent is extended or adjusted under 35 U.S.C. 154(b) by 292 days.

(21) Appl. No.: 12/731,282

(22) Filed: Mar. 25, 2010

Related U.S. Application Data

(60) Provisional application No. 61/202,687, filed on Mar. 27, 2009.

(51) Int. Cl.
*C08G 75/00* (2006.01)

(52) U.S. Cl.
CPC ................... *C08G 75/00* (2013.01)

(58) Field of Classification Search
CPC .................................... C08G 75/00
USPC ............................................ 524/609
See application file for complete search history.

(56) References Cited

U.S. PATENT DOCUMENTS

2008/0143019 A1* 6/2008 Chou ......................... 264/293

OTHER PUBLICATIONS

Ducan, R.; Ringsdorf, H.; Satchi-Fainaro, R. Adv. Poly. Sci. 2006. 192, 1-8.
Finne-Wistrand, A.; Albertson, A.-C. Annu. Rev. Mater. Res. 2006, 36, 369-395.
Gopferich, A.; Tessmar, J. Adv. Drug Deliv. Rev. 2002, 54, 911-931.
Katti, D.S.; Lakshmi, S.; Langer, R.; Laurenein, C. T. Adv. Drug Deliv. Rev. 2002, 54, 933-961.
Kumar, N.; Langer, R.; Domb, A. J, Adv. Drug Deliv. Rev. 2002, 54, 889-910.
Hoyle, C. E.; Lee, T. V.; Roper, T. J. Polym, Sci. Part A; Polym. Chem. 2004, 42, 5301-5338.
Reddy, S. K.; Cramer, N. B.; Bowman, C. N. Macromolecules 2006, 39, 3673-3680.
Conix, A. In Macromolecular Syntheses; Wiley; New York, 1963; vol. 2, pp. 95-99.
Anseth, K. S.; Shastri, V. R.; Langer, R. Nature Bintech, 1999, 17, 156-159.
Elbert, D. L.; Hubbell, J. A. Biomacromolecules 2001, 2, 430-441.
Lutolf, M. P.; Hubbell, J. A. Biomacromolecules 2003, 4, 713-722.
Rydholm, A. E.; Bowman, C. N.; Anseth, K. S. Biomaterials 2005, 26, 4495-4506.
Olson, D. A.; Grutton, S. E. A.; DeSimone, J. M.; Sheares, V. V. J. Am. Chem. Soc. 2006, 128, 13625-13633.
Fairbanks, B. D.; Scott, T. F.; Kloxin, C. J.; Anseth, K. S.; Bowman, C. N. Macromolecules 2009, 42, 2011-217.

* cited by examiner

*Primary Examiner* — Wenwen Cai
(74) *Attorney, Agent, or Firm* — Bond Schoeneck & King, PLLC; George McGuire; Erin Phillips

(57) ABSTRACT

The present the invention is directed to a process and the new materials that are biodegradable for medical use, particularly for drug delivery, therapeutic devices and gene therapy/delivery. The invention illustrates a method of producing a degradable material using polymers made from thiol compounds and alkene/alkyene compounds, wherein one of these compounds contains one or more anhydride groups; and using a thiol-ene step-growth polymerization process, initiated by a free radical initiator. The polymerization process is initiated through photochemical, redox or thermal means, or any combination thereof.

6 Claims, 3 Drawing Sheets

ELASTOMERIC AND DEGRADABLE POLYANHYDRIDE BY STEP-GROWTH THIOL-ENE PHOTOPOLYMERIZATION

CROSS REFERENCE

This disclosure is related to Provisional Patent Application Ser. No. 61/202,687 filed on Mar. 27, 2009, entitled Elastomeric and Degradable Polyanhydride Polymers by Step-Growth Thiol-Ene Photopolymerization and is hereby incorporated herein by reference.

FIELD OF THE INVENTION

The disclosure is related to a method to produce elastomeric and degradable polyanhydride polymers using a step-growth thiol-ene or thiol-yne photopolymerization process.

BACKGROUND OF THE INVENTION

There is an increasing need for new materials that are both biocompatible and biodegradable for medical use, particularly for drug delivery, therapeutic devices and gene therapy/delivery. Particularly common materials for such applications have been degradable polymers such as polyesters, including poly (L-lactic acid), poly(glycolic acid), and poly (lactic-co-glycolic acid). See Duncan, R.; Ringsdorf, H.; Satchi-Fainaro, R. *Adv. Poly. Sci.* 2006, 192, 1-8; and Finne-Wistrand, A.; Albertson, A.-C. *Annu. Rev. Mater. Res.* 2006, 36, 369-395 both incorporated herein by reference. However, these polyesters lack many properties necessary for medical applications, and undergo homogeneous, bulk degradation which is detrimental to the long-term mechanical properties of the material. Degradation rates can also be quite slow—from several months to years. Furthermore, their crystallinity leads to hard materials that deform upon degradation. In contrast, surface eroding polymers, such as polyanhydrides, maintain their mechanical integrity during degradation and exhibit a gradual loss in size. See Gopferich, A.; Tessmar, J. *Adv. Drug Deily. Rev.* 2002, 54, 911-931; Katti, D. S.; Lakshmi, S.; Langer, R.; Laurencin, C. T. *Adv. Drug Deily. Rev.* 2002, 54, 933-961; and Kumar, N.; Langer, R.; Domb, A. *J. Adv. Drug Deliv. Rev.* 2002, 54, 889-91 all hereby incorporated herein by reference.

SUMMARY OF THE INVENTION

The present embodiment of the invention is directed to a process for making materials that satisfy the need for materials that are biodegradable for medical use, particularly for drug delivery, therapeutic devices and gene therapy/delivery.

The object of the invention to illustrate a method of producing a degradable material using polymers made from thiol compounds and alkene/alkyne compounds, wherein one or more of these compounds contains one or more anhydride groups; and uses a thiol-ene (or thiol-yne) step-growth polymerization process, initiated by a free radical initiator. The polymerization process is initiated through photochemical, redox or thermal means, or any combination thereof.

The other additives, which may be degradable or non-degradable, have been added to improve properties such as hardness, hydrophilicity, hydrophobicity, biocompatibility, etc. The polymerization process is initiated through photochemical, redox or thermal means, or any combination thereof. The thiol compound(s) used in the process contain one or more thiol groups. The alkene or alkyne compounds contain one or more alkene or alkyne groups. The polymers may have a crosslinked structure or a linear structure (non-crosslinked structure).

BRIEF DESCRIPTION OF THE DRAWINGS

These and other features, aspects and advantages of the present invention will become better understood with regard to the following description, appended claims, and accompanying drawings where

DESCRIPTION OF THE INVENTION

Figure 1:
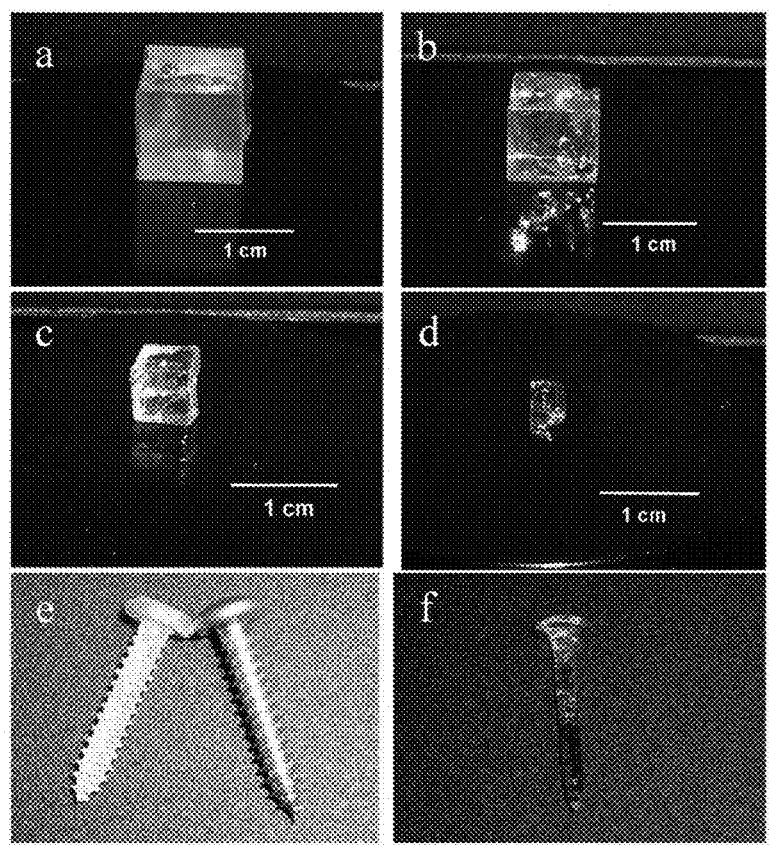
FIG. 1 illustrates cross a linked thiol polyanhydride cube after various time frames.

In this disclosure, we disclose that thiol-ene chemistry, (See Hoyle, C. E.; Lee, T.; Roper, T. *J. Polym. Sci. Part A: Polym. Chem.* 2004, 42, 5301-5338; and Reddy, S. K.; Cramer, N. B.; Bowman, C. N. *Macromolecules* 2006, 39, 3673-3680, all hereby incorporated herein by reference.) a step-growth mechanism of polymerization, can be applied to make materials that are elastomeric, photocurable and have controllable degradation rates, starting from only several hours. The use of alkyne compounds either in conjunction with, or instead of, the alkene compounds is also possible (See Fairbanks, B. D.; Scott, T. F.; Kloxin, C. J.; Anseth, K. S.; Bowman, C. N. *Macromolecules* 2009, 42, 211-217; such polymerizations will also hereby be included in any reference to thiol-ene polymerizations). The inclusion of an anhydride in one of the thiol-ene monomers is the key degradation functionality, allowing degradation of the crosslinked material to occur through the often-preferred surface degradation mechanism. (See Kumar, N.; Langer, R.; Domb, A. *J. Adv. Drug Deliv. Rev.* 2002, 54, 889-910; Conix, A. In *Macmmolecular Syntheses*; Wiley: New York, 1963; Vol. 2, pp 95-99; and Anseth, K. S.; Shastri, V. R.; Langer, R. *Nature Biotech.* 1999, 17, 156-159 all hereby incorporated herein by reference.

In comparison to the methacrylated anhydride monomers previously reported, (See Anseth, K. S.; Shastri, V. R.; Langer, R. *Nature Biotech.* 1999, 17, 156-159 hereby incorporated herein by reference.) thiol-ene chemistry uses simple and readily available monomers, and typically has lower susceptibility to oxygen, less shrinkage and more uniform crosslink density. See Hoyle, C. E.; Lee, T. Y.; Roper, T. *J. Polvm. Sci. Part A: Polym. Chem.* 2004, 42, 53015338 hereby incorporated herein by reference. Furthermore, thiol-ene polymerization occurs via a step-growth mechanism which results in the degradable functionality residing in the main chain, rather than a side chain, which reduces the molecular weight of the degradation products compared to chain growth polymerizations. See Elbert, D. L.; Hubbell, J. A. *Biomacromolecules* 2001, 2, 430-441; Lutolf, M. P.; Hubbell, J. A. *Biomacromolecules* 2003, 4, 713-722; and Rydholm, A. E.; Bowman, C. N.; Anseth, K. S. *Biomaterials* 2005, 26, 4495-4506 all hereby incorporated herein by reference. It is also possible to add a variety of thiol and ene monomers, which do not necessarily need to be degradable, in order to tune many of the properties of the final product, such as mechanical strength, degradation rate, degradation products, etc. Finally, not only can crosslinked materials be made, but anhydride-based linear pre-polymers can be synthesized and then subsequently crosslinked if desired. Thus the use of thiol-ene chemistry to make polyanhydride network polymers provides significant flexibility in tailoring of molecular characteristics such as crosslink density, functionality and hydrophilicity.

Scheme 1 provides an outline of the chemistry involved. The main components are (1) an anhydride-containing multi-ene compound and (2) a multi-thiol compound. These are shown in Scheme 1 as a diene anhydride and a tetrathiol, both of which are commercially available and were used in our preliminary experiments. It should be noted that the anhydride functionality could, in principle, be contained within the thiol entity. Furthermore, a linear (non-crosslinked polymer will be formed if both monomers are di-functional. Because of the step-growth mechanism, a slight excess of either the dithiol or the diene will result in linear polymers with thiol or ene end-groups, respectively. For a crosslinked network polymer to be formed, either the thiol or vinyl compound must have at least 3 functionalities.

(Oriel 500 W Hg lamp) for 15 minutes yielded a crosslinked cube. Several other experiments were performed in which some of the PETMP was substituted with an ethylene glycol-based dithiol (EGDE; 3,6-dioxa-1,8-dithiooctane), with the functional group stoichiometry always remaining at 1:1 thiol:ene, although this is not always necessary in order to achieve polymerization. Table 1 summarizes the materials made. The cubes obtained were slightly opaque (see FIG. 1) to clear, and had a rubbery feel to them. Because these contain thiols, odor was expected to be an issue. However, the PETMP and EGDT, as well as the final product, had only a minimal odor to them.

Scheme 2.

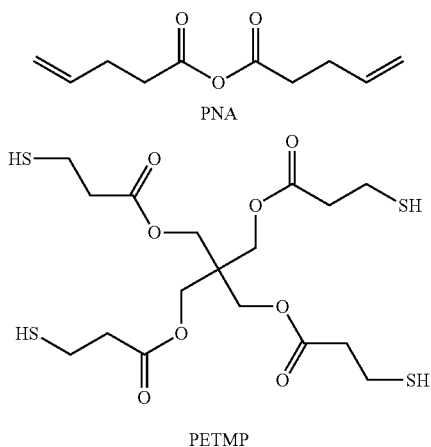

PNA

PETMP

Scheme 1

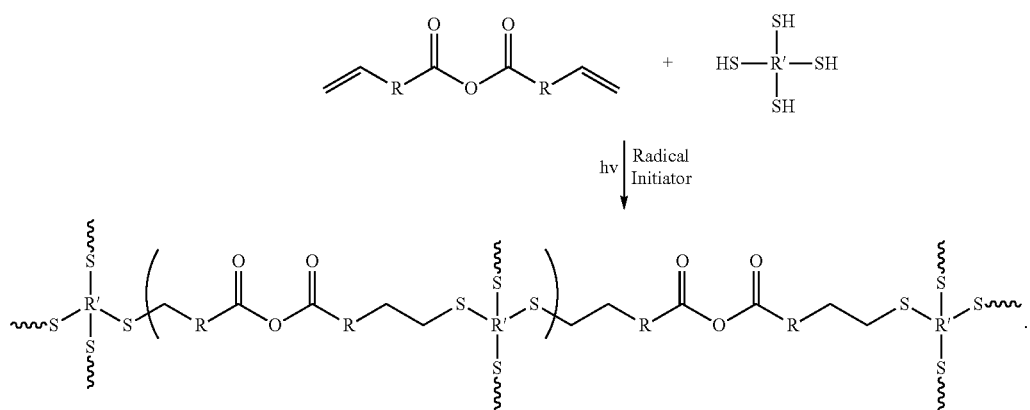

$\sim\sim\sim$ = structure within parentheses

Scheme 1 above illustrates the production of biodegradable network structure based on a tetrathiol-diene and anhydride chemistries.

Results and Discussion of Scheme 1

Initial experiments used stoichiometric amounts (in terms of thiol and ene groups) of 4-pentenoic anhydride (PNA) and pentaerythritol tetrakis (3-mercaptopropionate) (PETMP) (see Scheme 2), along with 1 wt. % of 1-hydroxycyclohexyl phenyl ketene as the photoinitiator. Approximately 1 ml solution was purged with N2 for 3 minutes and then added to a 1 cm$^3$ teflon mold and exposure to UV light -continued

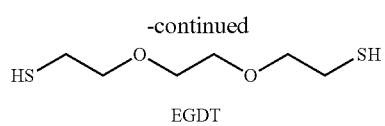

EGDT

Scheme 2 above illustrates the structures of 4-pentenoic anhydride (PNA), pentaerythritol tetrakis(3-mercaptopropionate) (PETMP), and 3,6-dioxa-1,8-dithiooctane ("ethyleneglycol dithiol", EGDT).

Time-lapse photographs of a crosslinked polyanhydride sample from Reaction 1 (Table 1) after being immersed in deionized water for various amounts of time at room temperature are illustrated in FIG. 1. These series of photographs clearly show that the cube retains the basic shape during the degradation process. The sample also remains firm throughout, even though the cube becomes smaller. Thus, we conclude that these polyanhydrides undergo the surface degradation mechanism that is commonly seen in other polyanhydride materials, (See Gopferich, A.; Tessmar, J. Adv. Drug Deliv. Rev. 2002, 54, 911-931, hereby incorporated herein by reference.) and appears to maintain most of the mechanical properties during the degradation. Also illustrated in FIG. 1 (e and f) are images of a screw that was cast using the thiol-ene chemistry in a PDMS mold of the metal screw. After 12 hours the screw had become smaller yet still had the overall shape and mechanical properties of the initial prototype screw. Dynamic mechanical analysis of a sample made with the composition of Reaction 1 showed that the glass transition temperature of −15° C., and a rubbery modulus value at 25° C. of 4.4 MPa, indicating the elastomeric properties of the material.

Table 1 below illustrates reaction quantities and mole ratios for thiol-ene photopolymerizations. All reactions included 1 wt. % photoinitiator.

TABLE 1

| Rxn | Amounts (ml) & mol. ratio (in parentheses) | | |
|---|---|---|---|
| | PNA | PETMP | EGDT |
| 1 | 0.768 (1) | 0.80 (1) | 0 (0) |
| 2 | 0.768 (1) | 0.60 (0.75) | 0.173 (0.25) |
| 3 | 0.768 (1) | 0.40 (0.5) | 0.344 (5) |
| 4 | 0.768 (1) | 0.20 (0.25) | 0.516 (0.75) |
| 5[a] | 0.25 (1) | (0) (0) | 0.23 (1) |
| 6[a] | 0.25 (1) | (0) (0) | 0.241.05) |
| 7[a] | 0.275 (1.1) | (0) (0) | 0.23 (1) |

[a]Also contained 50 vol. % CHCl$_3$.

FIG. 1 illustrates crosslinked thiol-ene polyanhydride cube (Rxn 1, Table 1) after (a) 0 hrs, (b) 18 hrs, (c) 48 hrs, (d) 72 hrs in deionized water; (e) polyanhydride prototype (left) of a metal screw (right; same formulation as Rxn 5) (f) after 12 hrs in deionized water.

Figure 2:
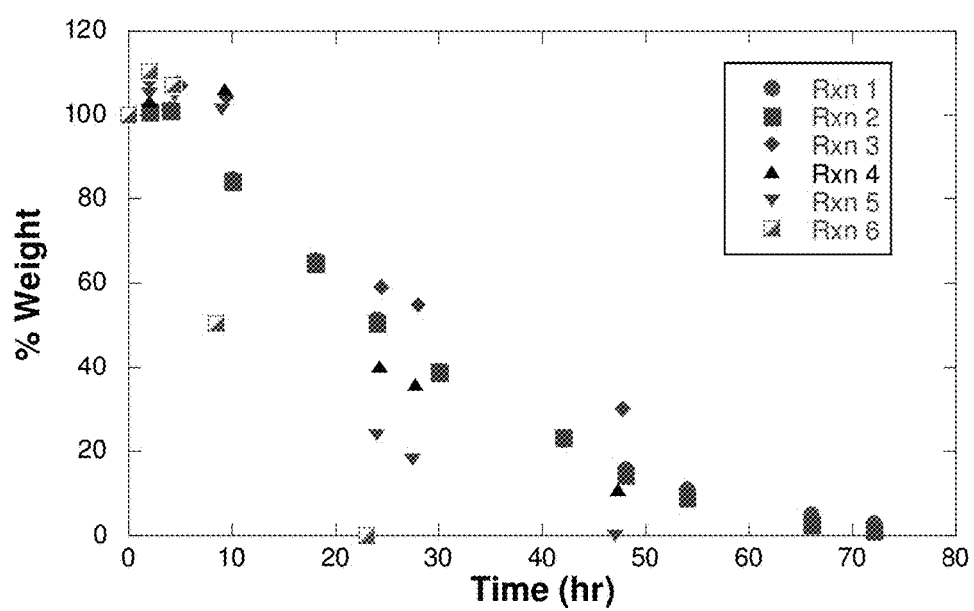
FIG. 2 illustrates degradation expresses as a percentage of weight loss of samples varying amounts of EGDT.

FIG. 2 illustrates the percentage weight lost as a function of degradation time. The samples were immersed in deionized water at room temperature for set time periods, removed and the excess water carefully wiped off. For the more hydrophobic materials, the hydrolyzed outer layer was not fully soluble but was easily removed by gentle scraping. Each sample showed a small increase in mass over the first few hours, presumably due to water absorption. The time for degradation is very dependent on the composition of the material. As would be expected, degradation time becomes shorter when more EGDT is included, since the EGDT is more hydrophilic, thus allowing water to be absorbed into the sample at a greater rate, resulting in faster hydrolysis of the anhydride. The addition of EGDT also reduces the crosslink density, which is another factor in reducing degradation times. Thus, one can easily tune the degradation rate through the appropriate amounts of hydrophilic or hydrophobic (or both) dithiols and/or by altering the crosslink density. It should also be noted that these degradation rates are much faster than those previously reported for elastic amorphous polyesters. See Olson, D. A.; Gratton, S. E. A.; DeSimone, J. M.; Sheares, V. V. J. Am. Chem. Soc. 2006, 128, 13625-13633 hereby incorporated herein by reference.

The degradation product from Reaction 1 (Table 1) was analyzed using $^1$H NMR spectroscopy to ensure that the degradation mechanism occurred through the hydrolysis of the anhydride. The spectrum clearly indicates that the tetrakis acid product is formed. A small set of peaks can also be seen at—1.3 ppm—these are probably due some head-to-head addition propagation reactions during the curing.

Figure 3:
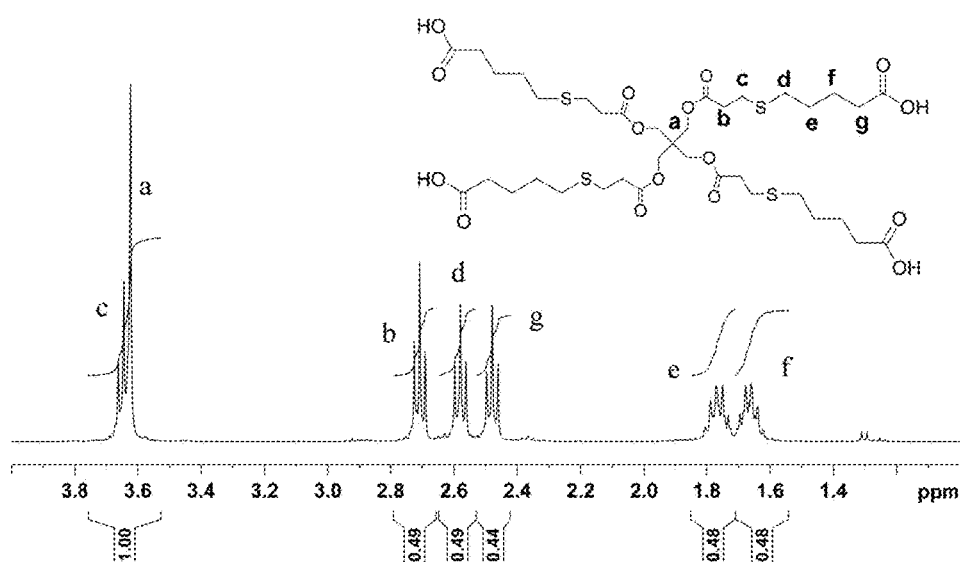
FIG. 3 illustrates $^1$H NMR spectrum of degradation product from Rxn 1, Table 1.

FIG. 2 illustrates degradation expressed as a percentage of weight lost of samples with varying amounts of EGDT. FIG. 3 illustrates a $^1$H NMR spectrum of degradation product from Rxn 1, Table I.

CONCLUSIONS

In summary, it has been demonstrated that linear and crosslinked polyanhydrides can be made using photoinitiated thiol-ene chemistry. This is a simple and effective method of making crosslinked structures that have surface degradation characteristics. Because of the step-growth mechanism and the possibility of combining other thiol and vinyl compounds (including acrylics and alkynes), the properties of the final materials can be expected to be widely tuned to suit many applications. This technology, therefore, may be expected to gain usage in many biomedical applications such as drug delivery, orthopedics, tissue engineering and scaffolds.

The claims below, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applications/patentees and others.

The following references are hereby incorporated herein by reference.

(1) Duncan, R.; Ringsdorf, H.; Satchi-Fainaro, R. Adv. Poly. Sci. 2006, 192, 1-8.
(2) Finne-Wistrand, A.; Albertson, A.-C. Annu. Rev. Mater. Res. 2006, 36, 369-395.
(3) Gopferich, A.; Tessmar, J. Adv. Drug Deliv. Rev. 2002, 54, 911-931.
(4) Katti, D. S.; Lakshmi, S.; Langer, R.; Laurencin, C. T. Adv. Drug Deliv. Rev. 2002, 54, 933-961.
(5) Kumar, N.; Langer, R.; Domb, A. J. Adv. Drug Deliv. Rev. 2002, 54, 889-910.
(6) Hoyle, C. E.; Lee, T. Y.; Roper, T. J. Polym. Sci. Part A: Polym. Chem. 2004, 42, 5301-5338.
(7) Reddy, S. K.; Cramer, N. B.; Bowman, C. N. Macromolecules 2006, 39, 3673-3680.
(8) Fairbanks, B. D.; Scott, T. F.; Kloxin, C. J.; Anseth, K. S.; Bowman, C. N. Macromolecules 2009, 42, 211-217.
(9) Conix, A. In Macromolecular Syntheses; Wiley: New York, 1963; Vol. 2, pp 95-99.
(10) Anseth, K. S.; Shastri, V. R.; Langer, R. Nature Biotech. 1999, 17, 156-159.
(11) Elbert, D. L.; Hubbell, J. A. Biomacromolecules 2001, 2, 430-441.
(12) Lutolf, M. P.; Hubbell, J. A. Biomacromolecules 2003, 4, 713-722.
(13) Rydholm, A. E.; Bowman, C. N.; Anseth, K. S. Biomaterials 2005, 26, 4495-4506.
(14) Olson, D. A.; Gratton, S. E. A.; DeSimone, J. M.; Sheares, V. V. J. Am. Chem. Soc. 2006, 128, 13625-13633.

What is claimed is:

1. A method of producing a degradable linear or cross-linked polymer comprising:
   polymerizing a first monomer and a second monomer using a thiol-ene step-growth polymerization process, initiated by a free radical initiator;
   wherein the first monomer is 4-pentenoic anhydride and the second monomer is pentaerythritol tetrakis(3-mercaptopropionate) or 3,6-dioxa-1,8-dithiooctane.

2. The method of claim 1 wherein said polymerization is initiated through photochemical, redox, thermal, or any combination thereof.

3. A degradable material comprising a linear or cross-linked polymer and one or more additives, wherein the linear or cross-linked polymer is made from a diene anhydride and a compound comprising one or more thiol groups:
   wherein the diene anhydride is 4-pentenoic anhydride;
   wherein the compound comprising one or more thiol group is pentaerythritol tetrakis (3-mercaptopropionate), or 3,6-dioxa-1,8-dithiooctane;
   wherein the linear or cross-linked polymer made via a thiol-ene polymerization mechanism initiated by a free radical indicator; and
   wherein the cross-linked polymer degrades from its surface.

4. The degradable linear or cross-linked polymer of claim 3, wherein the polymerization is initiated through photochemical, redox, thermal, or any combination thereof.

5. The degradable linear or cross-linked polymer of claim 4, wherein the one or more other additives may be degradable or non-degradable, and wherein the one or more other additives improve a property of the polymer.

6. A degradable linear or cross-linked polymer made from the method according to claim 1.

* * * * *